US012646362B2

(12) United States Patent
Paoletti et al.

(10) Patent No.: US 12,646,362 B2
(45) Date of Patent: Jun. 2, 2026

(54) TRACKED VEHICLE, MONITORING AND/OR CONTROL AND/OR MANAGEMENT SYSTEM OF TRACKED VEHICLE AND RELATED METHOD

(71) Applicant: PRINOTH S.P.A., Vipiteno (IT)

(72) Inventors: Alberto Paoletti, Vipiteno (IT); Francesco Salis, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 155 days.

(21) Appl. No.: 18/767,303

(22) Filed: Jul. 9, 2024

(65) Prior Publication Data

US 2025/0022323 A1 Jan. 16, 2025

(30) Foreign Application Priority Data

Jul. 13, 2023 (IT) ........................ 102023000014697

(51) Int. Cl.
| | |
|---|---|
| *H04L 12/24* | (2006.01) |
| *B62D 55/06* | (2006.01) |
| *G07C 5/00* | (2006.01) |
| *H04L 41/0803* | (2022.01) |
| *H04W 4/44* | (2018.01) |

(52) U.S. Cl.
CPC ............. *G07C 5/008* (2013.01); *B62D 55/06* (2013.01); *H04W 4/44* (2018.02)

(58) Field of Classification Search
CPC ......... G07C 5/008; B62D 55/06; H04W 4/44; E02F 9/205; E02F 3/76; E02F 3/769; E02F 9/26; E01H 4/02
USPC ....................................................... 709/249
See application file for complete search history.

(56) References Cited

U.S. PATENT DOCUMENTS

| | | | | |
|---|---|---|---|---|
| 9,086,941 | B1 * | 7/2015 | Siegel | ...................... H04L 67/55 |
| 2015/0134221 | A1 * | 5/2015 | Pelletier | ................. B62D 55/06 |
| | | | | 701/87 |
| 2018/0081614 | A1 * | 3/2018 | Tsai | ................... G01C 21/3688 |
| 2019/0375370 | A1 * | 12/2019 | Kirchmair | ............... B60R 25/24 |
| 2022/0006669 | A1 * | 1/2022 | Wang | ....................... H04L 67/12 |
| 2022/0185303 | A1 * | 6/2022 | Friedberger | ........... G07C 5/085 |

(Continued)

FOREIGN PATENT DOCUMENTS

| | | | | |
|---|---|---|---|---|
| JP | | S62119763 A | * | 6/1987 |
| JP | | 2013159146 A | * | 8/2013 |

OTHER PUBLICATIONS

Italian Search Report and Written Opinion for Application No. IT202300014697 dated Jan. 22, 2024.

*Primary Examiner* — Moustafa M Meky
*Assistant Examiner* — Elizabeth Kassa
(74) *Attorney, Agent, or Firm* — Neal, Gerber & Eisenberg LLP

(57) ABSTRACT

Tracked vehicle, such as a snow groomer for preparing ski slopes, including a plurality of devices, a vehicle control device coupled to the plurality of devices, a human machine interface, an asynchronous communication network; and a first synchronous communication bus assembly in particular comprising at least one synchronous communication bus, such as of the CAN-bus type. The human machine interface and the network device are coupled together via the asynchronous communication network. Additionally, the vehicle control device, the human machine interface and the devices are linked in communication with each other via the first synchronous communication bus assembly.

13 Claims, 6 Drawing Sheets

(56) References Cited

U.S. PATENT DOCUMENTS

| | | | |
|---|---|---|---|
| 2022/0282460 A1* | 9/2022 | Oglesby ................. | E02F 3/439 |
| 2022/0412047 A1 | 12/2022 | Hama et al. | |
| 2024/0045422 A1* | 2/2024 | Peizner .............. | G06F 16/2358 |
| 2024/0375612 A1* | 11/2024 | Norstad ................. | B60R 25/30 |
| 2024/0426620 A1* | 12/2024 | Fukumoto ............ | H04W 24/08 |

* cited by examiner

TRACKED VEHICLE, MONITORING AND/OR CONTROL AND/OR MANAGEMENT SYSTEM OF TRACKED VEHICLE AND RELATED METHOD

PRIORITY CLAIM

This application claims the benefit of and priority to Italian Patent Application No. 102023000014697, filed on Jul. 13, 2023, the entire contents of which is incorporated by reference herein.

TECHNICAL FIELD

The present disclosure relates to a tracked vehicle, monitoring and/or control and/or management system of the tracked vehicle, and a monitoring and/or control and/or management method of the tracked vehicle.

BACKGROUND

Tracked vehicles comprise a plurality of devices and a vehicle control device connected to and controlling these devices. In particular, the devices are of various types, such as an internal combustion engine, an electric rotating machine unit, in particular an electric motor, an electric and/or mechanical and/or hydraulic power transmission unit, a hydraulic pump, hydraulic and/or electric and/or electronic and/or electro-hydraulic actuator, signalling devices, conditioning unit, sensors for detecting one or more dimensions of the tracked vehicle, a winch, a tiller, a shovel, control input devices in particular joysticks, levers, mini-levers, push buttons.

The tracked vehicle devices are controlled by the vehicle controller directly or via a dedicated control unit of the respective device, which is in turn controlled by the vehicle control device.

In addition, the vehicle control device stores configuration parameters for each the devices.

In addition, the control device usually comprises software that runs on its own hardware and is configured, among other things, to detect faults or operating malfunctions in the devices the software controls. In addition, the control device stores malfunction and/or error events of the vehicle, in particular of each device.

On tracked vehicles, to perform a software update and/or to view current or past configuration and/or operating parameters and/or current or past measured signal values and/or to change stored configuration parameters and/or to detect faults and/or malfunctioning and/or to view errors and/or malfunction events detected in the past, a maintenance technician must physically go to the tracked vehicle and connect a computer to the vehicle control device via a data connection port to the vehicle bus of the vehicle (e.g., an OBD port or other type of port). In all cases, a maintenance technician must be physically at the same location as the tracked vehicle because he/she must directly and physically access the communication port of a vehicle bus.

However, tracked vehicles are configured to operate in relatively very remote and/or relatively difficult-to-access areas, which means that tracked vehicles can be stationary for a long time before a maintenance technician can physically visit the tracked vehicle to carry out a repair that really only involves the software, such as, for example, a software update, or a new setting of configuration parameters, or a reset of an unintentionally changed configuration parameter setting, or a vehicle diagnosis, or a malfunction detection, or an analysis of signals detected under certain circumstances.

This lengthens the diagnosis and/or repair time and, consequently, the cost of diagnosis and/or repair even for problems that are relatively easy to solve and for which the actual diagnosis and/or repair and/or maintenance time is relatively short.

SUMMARY

The purpose of the present disclosure is to provide a tracked vehicle that reduces at least certain of the disadvantages of certain of the prior art.

According to certain embodiments of the present disclosure, a tracked vehicle includes a plurality of devices, wherein at least one device of the plurality of devices is selected from an assembly including at least two of: a drive unit, an electric rotating machine unit, a power transmission unit, a hydraulic pump, an actuator, a plurality of tracks, a drive wheel, a signalling device, a conditioning unit, a sensor configured to detect a dimension of the tracked vehicle, a winch unit, a tiller unit, a shovel, a blade, a control input device. The tracked vehicle of these embodiments includes a vehicle control device coupled to the plurality of devices and configured to send command signals to the devices and receive at least one of detection signals and command signals from the devices to at least one of control the devices and receive commands from the devices. The tracked vehicle of these embodiments includes a radio link device configured to transmit data, via radio waves, to a data processing system remote from the tracked vehicle, and a human machine interface including a processing unit, a memory, a screen and a selection device configured to receive commands from an operator. The tracked vehicle of these embodiments includes a network device coupled in communication from one side with at least one of the human machine interface and the vehicle control device, and from the other side with the radio link device, the network device configured to couple, in radio communication, at least one of the human machine interface and the vehicle control device with the radio link device to communicate data with the data processing system. The tracked vehicle of these embodiments includes an asynchronous communication network configured to couple the human machine interface and the network device together, and a synchronous communication system including a first synchronous communication bus assembly configured to link, in communication, the vehicle control device, the human machine interface and the plurality of devices, to each other, and a second synchronous communication bus assembly configured to communicatively connect the vehicle control device to the network device. In certain embodiments, the remote and/or external data processing system include at least one of: a remote-control device, a remote human machine interface, a personal computer external to the vehicle, a tablet external to the vehicle, a mobile phone external to the vehicle.

It should be appreciated that in accordance with the present disclosure, it is possible to achieve at least one of the following technical effects: remotely updating the software of the tracked vehicle and/or one or more electronic parts thereof and/or of the vehicle control device and/or of the devices in particular of the control unit of the devices via the human machine interface; remotely updating the software of the human machine interface; setting or resetting one or more configuration parameters of the tracked vehicle, in particular one or more of the vehicle devices by remotely connecting to the human machine interface which in turn has the possibility to connect via the synchronous connection system and/or via the asynchronous connection network to the vehicle control device; remotely displaying via the remote connection to the human machine interface all the signals passing over the communication synchronous system and, consequently, monitoring in real time the values/data detected of the accessories; instructing and/or guiding an operator of the tracked vehicle remotely; carrying out real-time processing of data in the memory of the human machine interface and/or data travelling on the synchronous communication system to verify usage, to verify operating and/or configuration parameters and/or to assist the operator, in certain instances, independently of what the operator is viewing on the screen, via a data connection in real time with the human machine interface; possibility of remote mirroring of the human machine interface. In other words, the present disclosure enables for the possibility to perform one or more actions on the tracked vehicle remotely without the need for a device to be physically connected to an OBD connector and/or to the CAN-BUS of the vehicle, thus, without the need for a maintenance technician to physically travel to the location of the tracked vehicle.

Another purpose of the present disclosure is to provide a system and/or method for monitoring and/or controlling and/or managing a tracked vehicle and/or a fleet of tracked vehicles that reduces at least certain of the drawbacks of certain of the prior art.

BRIEF DESCRIPTION OF THE DRAWINGS

Further characteristics and advantages of the present disclosure will become clear from the following description of non-limiting embodiments thereof, with reference to the figures of the attached drawings, wherein.

DETAILED DESCRIPTION

Figure 1:
FIG. 1 is a side view of a tracked vehicle made in accordance with the present disclosure.

With reference to FIG. 1, a tracked vehicle, in particular a snow groomer vehicle for preparing ski slopes, according to an embodiment of the present disclosure is referred to as a whole by the number 1.

In another embodiment (not illustrated in the accompanying figures), a tracked vehicle is a vegetation management vehicle comprising a mulcher mounted at the front of the vehicle and capable of mulching even large plants (e.g., parts of trees or roots or other vegetation).

Figure 2:
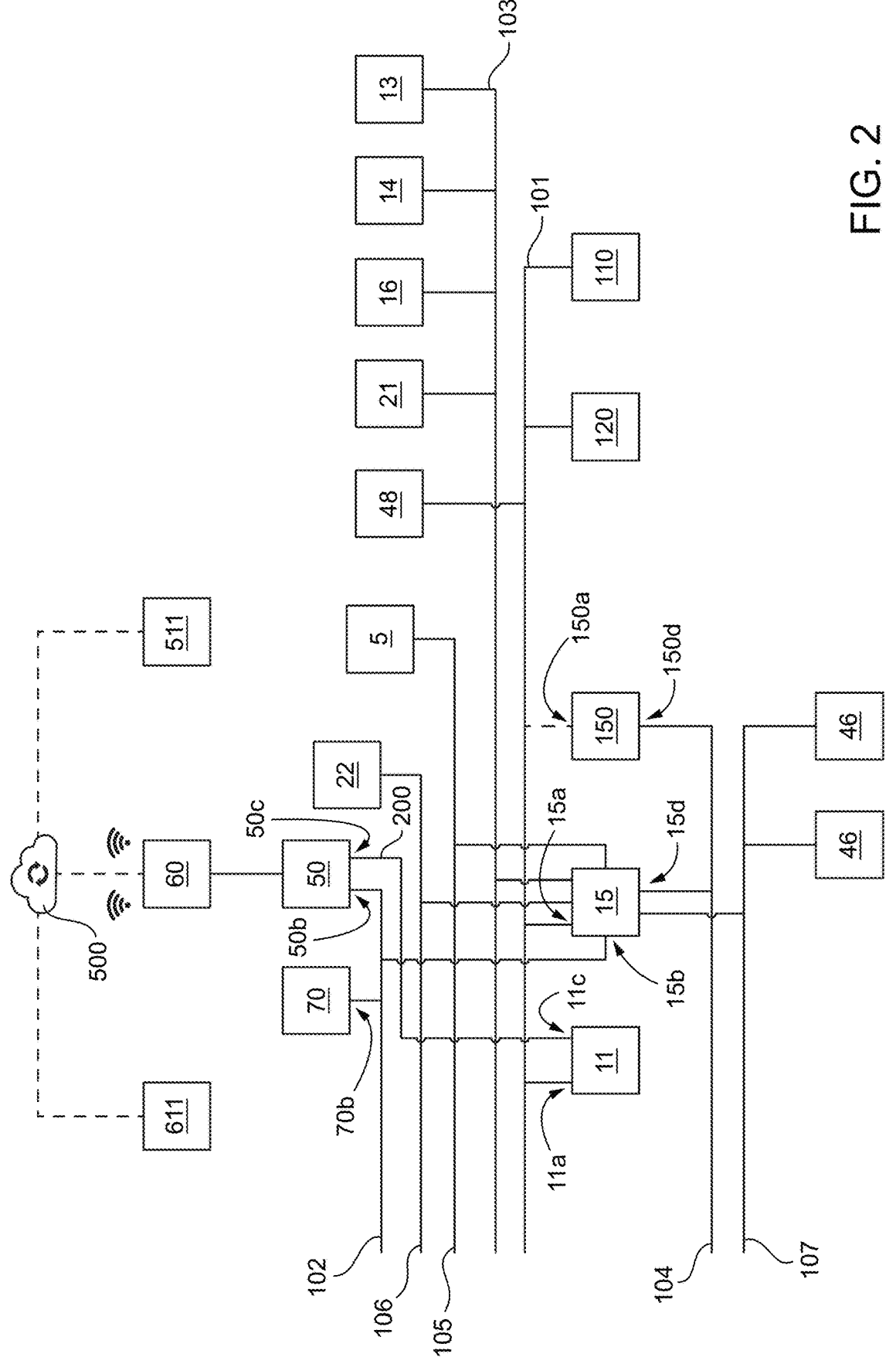
FIG. 2 is a block diagram of a detail of an embodiment of the tracked vehicle 1.
Figure 3:
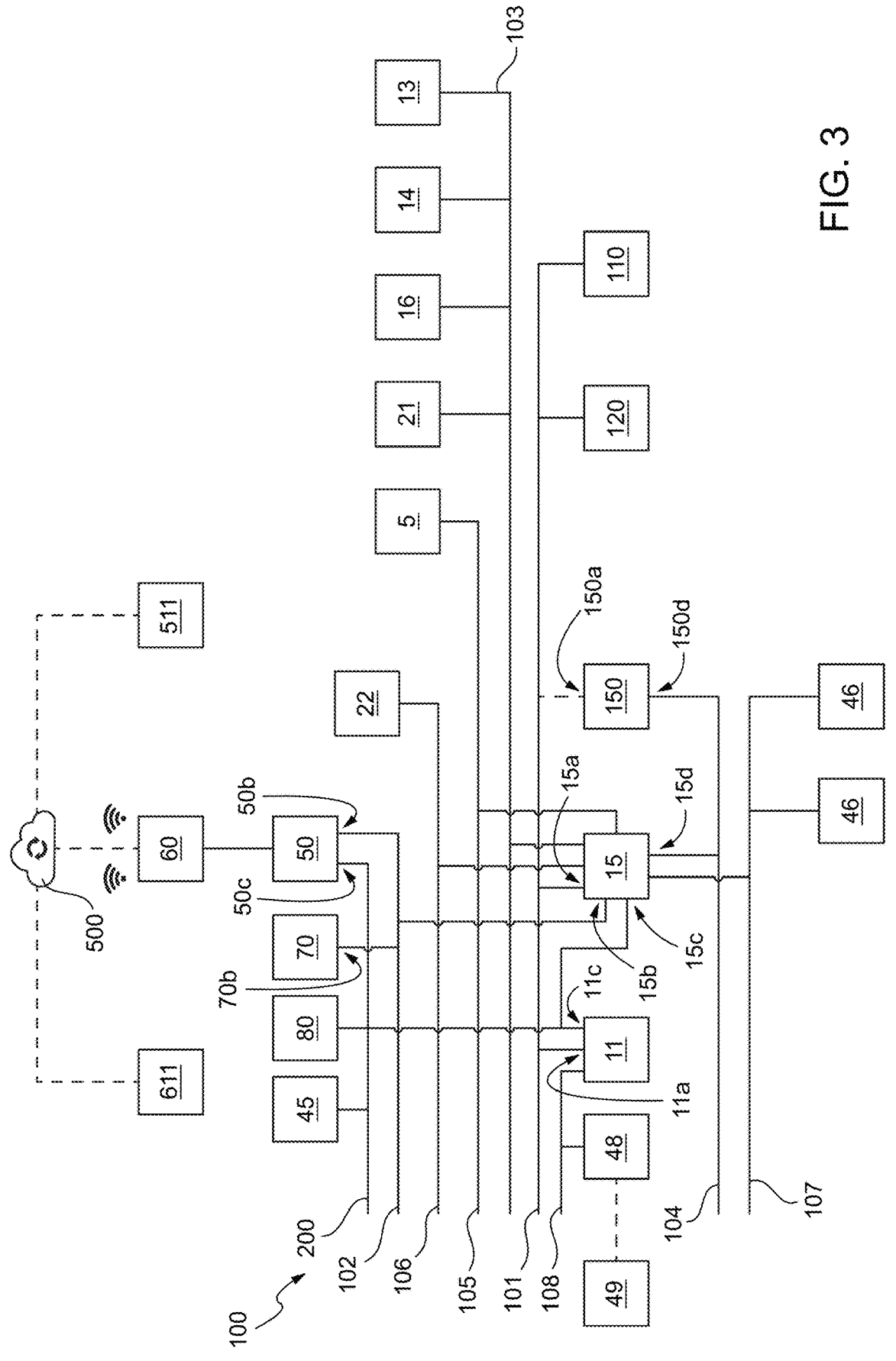
FIG. 3 is a block diagram of a detail of a further embodiment of the tracked vehicle 1.

The tracked vehicle 1 comprises a chassis 2, which extends along a longitudinal axis D, a driver's cab 3 housed on the chassis, a plurality of devices and a vehicle control device 15 (FIG. 2) connected to and controlling these devices.

The vehicle control device 15 can be defined by a device that is referred to in the technical field as an engine control unit/module ("ECU") or vehicle electronic control unit ("VECU") or powertrain control unit/module ("PCU/PCM").

In particular, the vehicle control device 15 is coupled to the plurality of devices and configured to send command signals to the devices and receive detection signals and/or command signals from the devices to control the devices and/or receive commands from the devices.

In general, unless otherwise specified, device means any active part of the tracked vehicle 1 which is connected in communication with the vehicle control device 15 and in which, in certain instances, at least some functions of the device are directly or indirectly controlled and/or monitored and/or managed by the vehicle control device 15 and/or the device sends commands to the vehicle control device 15.

The devices are of various types. Various devices will be illustrated below, but this is intended as a non-limiting and not inclusive list of all the devices. In particular, one of the devices is a drive unit 5, for example an internal combustion engine and/or an electric rotating machine unit comprising one or more electric rotating machines, in particular one or more electric motors.

Other devices of the plurality of devices are the accessory devices 7. The accessory devices 7 comprise a blade or shovel 8, supported at the front of chassis 2; and/or a tiller unit 9, supported at the rear of the chassis 2. In other words, the blade or shovel 8 defines one of the devices of the plurality of devices of the tracked vehicle 1 and the tiller unit 9 defines one of the devices of the plurality of devices of the tracked vehicle 1.

The tiller unit 9 comprises a tiller and a finisher. In certain embodiments, the tiller unit 9 includes auxiliary tillers (not shown) and tracker units (not shown) for marking out cross-country ski trails.

The tiller unit 9 is connected to the chassis 2 of the tracked vehicle 1 in such a way that the tiller unit can be rotated (i.e., by arranging the tiller unit 9 perpendicular or at an angle to the direction of travel of the tracked vehicle 1 itself, raised or lowered, and laterally shifted). In certain embodiments, it is possible to determine a relative angular position of the tiller unit 9 in relation to the chassis 2 to define a cutting angle for the tiller unit 9.

In certain embodiments, the tiller unit 9 of the tracked vehicle 1 comprises two side wings (flaps) configured to vary their positions with respect to a central body of the tiller unit 9, in particular the rotating shaft of the tiller 9.

The blade 8 is connected to the chassis 2 of tracked vehicle 1 with a plurality of couplings and actuators so that the pitch, roll and yaw movements of the blade 8 around the forward direction of the tracked vehicle 1 can be performed.

In certain embodiments, the accessory devices 7 include a winch unit 10.

With reference to FIG. 1, the winch unit 10 comprises a drum 17 on which a cable 18 is wound and a boom 19. The drum 17 rotates about an axis A and is driven by a motor and defines the pulling force of the cable 18. The winch unit 10 or a boom 19 of the winch unit 10 rotates about an axis B and is driven by an actuator to define the position of the winch unit 10 or a boom 19 of the winch unit 10 to steer the cable 18.

The accessory devices 7 may also be called accessories.

Consequently, the winch unit 10 is one of the devices of the plurality of devices.

Furthermore, it should be appreciated that a tracked vehicle 1 does not necessarily comprise all the accessory devices 7 illustrated above. For example, a tracked vehicle 1 may comprise any one or two of the accessory devices 7 selected from the blade 8, tiller unit 9 and winch unit 10.

In certain embodiments, another device in the plurality of devices are the tracks 6 with their respective drive wheel.

In certain embodiments, another device of the plurality of devices is a power transmission unit 12 (FIG. 1) which is operatively coupled to the drive unit 5, and transfers the power required for the operation of the tracked vehicle 1, to the accessory devices 7. The power transmission unit 12 can be hydraulic or electric or electronic or a combination of hydraulic and/or electric and/or electronic and/or mechanical and/or electro-hydraulic.

In certain embodiments, one of the devices can be defined by a hydraulic pump, hydraulic and/or electric and/or electronic and/or electro-hydraulic actuator of the tracked vehicle 1.

In certain embodiments, another device is a control device 4 and/or a joystick 13.

The control device 4 is configured to drive the tracks 6. In more detail, the control device 4 is coupled to the plurality of tracks 6 to drive the forward movement of the tracked vehicle 1.

The joystick 13 is coupled to the accessory devices 7 to drive the movements of the accessory devices 7.

The joystick 13 is configured to control the blade 8. The joystick 13 is housed in the cab 3 and enables the described pitch, roll and yaw movements of the blade 8 to be controlled.

In certain embodiments, the blade 8 of the tracked vehicle 1 comprises a central blade and two side blades coupled to the central blade and configured to vary their positions with respect to the central blade.

The joystick 13 is configured to control the tiller unit 9 and enables the movements described above of the tiller unit 9 to be controlled.

The joystick 13 is configured to control the winch unit 10, in particular the tensile force of the cable 18 and the angular position of the boom 19.

In certain embodiments, another device is/are one or more keypad(s) 14 and 16 for controlling certain functions of the tracked vehicle 1 that are connected in communication with the vehicle control device 15.

In certain embodiments, another device is an encoder 21 which is connected in communication with the vehicle control device 15.

In certain embodiments, another device of the plurality of devices is defined by one or more signalling devices.

In certain embodiments, another device of the plurality of devices is defined by one or more signal conditioning units.

In certain embodiments, another device of the plurality of devices is defined by one or more sensors to detect one or more dimensions of the tracked vehicle.

In a non-limiting embodiment of the present disclosure, some or all of the devices, in particular some or all of those illustrated above, further comprise a control unit for each device and wherein each the control unit is connected in communication with the vehicle control device 15, whereby the vehicle control device 15 controls the device via its respective control unit.

The tracked vehicle 1 comprises a human machine interface 11. In particular, the human machine interface 11, such as a dashboard, is configured to communicate with the vehicle control device 15 and with some or all of the devices.

In particular, the human machine interface 11 comprises a screen 30, a selection device 31 for receiving commands from a user, a processing unit 32 and a memory 33.

The screen 30 can be of the touch-sensitive type (touch screen) and, consequently, the selection device 31 can be totally or partially integrated into the screen 30 so that the operator can act directly by touching the screen 30 to give input commands to the human machine interface 11. In other words, the selection device 31 can be a device for detecting at least one touch on the screen 30 or a selector. The selection device is configured to detect selections of a tracked vehicle operator U to receive commands from the operator.

In certain embodiments, the human machine interface 11 comprises a graphical user interface.

In an alternative embodiment, the human machine interface 11 can be a tablet computer (or tablet PC).

The human machine interface 11 is configured to show the operator U data and/or information and/or operating parameters and/or configuration of the tracked vehicle 1.

The human machine interface 11 is, in certain embodiments, installed in the driver's cab 3, and enables an operator to control and/or monitor and/or manage the tracked vehicle 1, in particular one or more operating parameters and/or one or more measured values of operating dimensions of the tracked vehicle 1 and in particular one or more operating parameters and/or measured values of operating dimensions of one or more accessories and/or devices of the tracked vehicle 1.

In certain embodiments, the human machine interface 11 enables the operator to select one or more data and/or information and/or parameters and/or values of the tracked vehicle 1 to be displayed on the screen 30, in particular one or more data and/or information and/or parameters and/or values of one or more accessories.

The vehicle control device 15 is coupled to the user interface 11 and is configured to send images to the screen 30 and/or to receive commands from the human machine interface 11.

Further, in certain embodiments, the tracked vehicle comprises a tracking device, in particular a GPS receiver or the like, configured to determine the position of the tracked vehicle 1 and comprising, in certain embodiments, a memory with a plurality of maps, in particular maps of ski areas to locate the position of the tracked vehicle 1 within one of the ski areas.

Further, in certain embodiments, the tracked vehicle 1 comprises a camera 45 or cameras, in certain instances fixed at a rear and/or rear position of the tracked vehicle 1. In particular, the camera 45 faces the rear of the tracked vehicle 1 to frame a portion of the terrain over which the tracked vehicle 1 has passed.

Further, in certain embodiments, the tracked vehicle 1 comprises a snow depth measurement device 80 to provide snow depth data.

Further, in certain embodiments, the tracked vehicle 1 comprises at least one thermometer inside and/or outside the driver's cab of the tracked vehicle to measure the internal and/or external temperature, respectively.

In various embodiments, the vehicle control device 15 is coupled in communication with one or more of the devices of the tracked vehicle 1 that have been defined above and/or to the tracked vehicle 1 in general and detects one or more of the data and/or information and/or operating parameters and/or values of the one or more devices of the tracked vehicle 1 and/or the tracked vehicle 1 in general. For example any one or any combination or all of the following data and/or information and/or operating parameters and/or values: operating parameters of the drive unit 5 (e.g., number of engine revolutions, power output of the drive unit 5 and/or number of revolutions of the drive unit 5) and/or data relating to a control light of the drive unit 5 and/or number of total working hours of the drive unit 5 and/or temperature of a liquid of the drive unit 5 and/or the level(s) of residual fuel energy of the drive unit 5 in an energy harvesting system (e.g., the level of residual fuel in a fuel tank when the drive unit 5 is an internal combustion engine or the level of residual electrical energy in a battery when the drive unit 5 is an electric motor or the levels of fuel and electrical energy when the drive unit 5 is a hybrid comprising a combustion engine and an electric motor); power absorbed by each of the accessory devices 7; position of the blade 8 and the tiller unit 9; position of the winch unit 10; track parameters 6 (e.g., track tension 6); total distance travelled in the life of the tracked vehicle; data relating to the inclination of the tracked vehicle 1 along a longitudinal axis, in particular to display the roll angle of the tracked vehicle 1 around a roll axis; and/or data relating to the inclination of the tracked vehicle 1 along a transverse axis, in particular to display the pitch angle around a pitch axis; parameters of the tracking device 40 (e.g., position and/or navigation maps loaded into the memory and/or routes taken and displayed on the tracking device 40 and/or other setting parameters); parameters of one or more of the cameras 50 (e.g., camera image and/or configuration parameters); parameters of the at least one tracked vehicle thermometer 1 (e.g., temperature detected); if a winch 10 is included, parameters of the winch 10, for example turning cable length and/or towing force in absolute value and/or as a percentage of the total possible towing force; parameters of the tiller 9 for example shaft rotation speed and/or direction of shaft rotation and/or angle of inclination of the tiller 9 with respect to the snow and/or percentage of snow recirculation within a working chamber of the tiller 9; position of the blade 8 in particular roll and/or pitch and/or yaw of the blade 8 and/or position of the side blades of the shovel 8; parameters relating to the current position of the side wings of the tiller 9; number of engine unit 5 revolutions, accelerator pedal position, total engine unit 5 hours, average and/or instantaneous fuel consumption, status (on or off) of the tiller unit 9, rotational speed of the tiller unit 9, depth of the tiller unit 9, winch unit 10 status, instantaneous percentage torque of the engine unit 5, winch unit 10 pulling force, tiller unit 9 pressure, tiller unit 9 operating mode, vehicle 1 travel speed, vehicle 1 travel direction, winch unit 10 rotation speed, engine unit temperature(s) (such as cooling) 5, winch unit 10 length (residual and/or released), winch unit 10 status, hydraulic oil temperature, light status(es), alarm status(es), buzzer status (es). In other words, the vehicle control device 15 is configured to detect data and/or information and/or operating parameters and/or values of the tracked vehicle 1.

In certain embodiments, the operating parameters are configuration parameters of any of the devices of the tracked vehicle 1, for example switching on one of the plurality of lighting devices arranged along the tracked vehicle 1 to illuminate the surrounding working environment or, for example, of the internal configuration parameters of the drive unit 5 and/or the tiller 9 and/or the winch 10 and/or the tracks 6 and/or a hydraulic system of the tracked vehicle 1 for example the hydraulic system supplying the tracks 6 and/or the winch 10 and/or the shovel 8 and/or the tiller 9, or the style and/or the colours and/or the icons or one or more display modes of the various screens that the screen of the human machine interface 11 of the tracked vehicle 1 shows.

In certain embodiments, the operating parameters are the values of dimensions or signals, in particular time variants, measured at a given time of the tracked vehicle and/or one or more of the tracked vehicle's devices (e.g., current speed of rotation of the winch or tiller and the like).

In certain embodiments, the vehicle control device 15 is coupled in communication with the plurality of devices and sets the operating parameters of the plurality of devices, for example configuration parameters of the drive unit 5 in particular relating to the power to be delivered; configuration parameters of each of the accessory devices 7, for example configuration parameters relating to the position of the blade 8 and the tiller unit 9, the position of the winch unit 10, the forward speed of the tracked vehicle 1 and drives each device according to the commands tracked vehicle receives from the user via the control device 4 and the operating parameters set for the device.

Furthermore, in certain embodiments, the vehicle control device 15 is coupled in communication with the plurality of devices and detects the values of the dimensions or signals relating to the operation of the devices, for example the power output at a given moment; the position of the blade 8 and/or the tiller unit 9, the position of the winch unit 10, the forward speed of the tracked vehicle 1 detected at a given moment.

In certain embodiments, another device of the tracked vehicle 1 is a car radio 48.

The devices of the tracked vehicle 1 are controlled by the vehicle control device 15 directly or via the dedicated control unit of the respective device, which is in turn controlled by the vehicle control device 15.

Further, the vehicle control device 15 comprises a memory in which the operator codes are stored. When starting the vehicle, the operator enters his operator code and the vehicle control device 15 sets one or more operating parameters (also called configuration parameters) and one or more functions of the tracked vehicle 1 itself according to the operator code entered when starting the tracked vehicle 1.

In one embodiment, the operator enters the operator code via an electronic key (e.g., a key that connects wirelessly to the human machine interface 11). In certain embodiments, the electronic key uses NFC technology to connect to the human machine interface 11 and automatically enter its operator code.

In certain embodiments, for each device, the vehicle control device 15 or the respective dedicated control unit comprises a memory in which the operating (or configuration) parameters of that device are stored.

In an alternative embodiment, the operator codes are stored in the memory of the human machine interface 11, and the human machine interface 11 sets one or more operating parameters (also called configuration parameters) and one or more functions of the tracked vehicle itself based on the operator code entered when starting the tracked vehicle.

Further, the vehicle control device 15 and each control unit comprise a hardware block and software running on the hardware block.

Each software is configured, among other things, to detect faults or malfunctions of the devices the software controls and send an error signal to the control device 15 and/or the human machine interface 11.

The tracked vehicle 1 comprises a radio link device 60 configured to transmit data via radio waves to a remote and/or external data processing system 511 from the tracked vehicle, in particular via a radio data network.

In a non-limiting embodiment, the remote and/or external processing system 511 comprises a computer cloud 500.

In another non-limiting embodiment, the remote and/or external processing system 511 is connected to the tracked vehicle 1 via a computer cloud 500. In more detail, the tracked vehicle 1 uploads data to the computer cloud 500 and receives commands from the computer cloud 500 and the remote and/or external processing system 511 receives data from the computer cloud 500 and sends commands to the computer cloud 500.

The tracked vehicle 1 comprises a network device 50 coupled in communication on one side with the human machine interface 11 and/or the vehicle control device 15 and on the other side with the radio link device 60 and configured to couple in radio communication the human machine interface 11 and/or the vehicle control device 15 with the radio link device 15 to send and/or receive data to the remote and/or external data processing system 511.

In a non-limiting embodiment of the present disclosure, the tracked vehicle 1 comprises a communication system 100 comprising one or more communication bus assemblies, such as of the CAN-bus type.

In certain embodiments, the communication system 100 is synchronous.

In certain embodiments, the communication system 100 comprises at least a first synchronous communication bus assembly 101, a second synchronous communication bus assembly 102, and in certain instances, at least a third synchronous communication bus 103.

In particular, the first synchronous communication bus assembly 101 comprises at least one synchronous communication bus, in particular a CAN-bus communication bus.

The vehicle control device 15, the human machine interface 11 and the devices are connected in communication with each other via the communication system 100, in particular at least a portion of the devices are connected to the human machine interface 11 via the first synchronous communication bus assembly 101.

Further, in certain embodiments, the second synchronous communication bus assembly 102 comprises at least one synchronous communication bus in particular a CAN-bus communication bus.

The vehicle control device 15 is connected in communication to the network device 50 via the second synchronous communication bus assembly 102. In particular, the first communication bus assembly 101, the second communication bus assembly 102, and in certain instances, the at least third communication bus assembly 103, are physically distinct from each other.

In a non-limiting embodiment, at least one of the joystick 13, the keypad 14, the keypad 16 and the encoder 21 are connected to the vehicle control device 15 via the third communication bus assembly instead of via the first communication bus assembly. In different embodiments, the third communication bus assembly 103 can be connected to the human machine interface 11 or not.

In a non-limiting embodiment of the present disclosure, the first communication bus assembly 101 is configured to provide a data exchange rate of 300 kbit/s to 700 kbit/s, such as equal to 500 kbit/s+/−100 kbit/s.

In a non-limiting embodiment of the present disclosure, the second communication bus assembly 102 is configured to provide a data exchange rate of 150 kbit/s to 350 kbit/s, such as equal to 250 kbit/s+/−50 kbit/s.

In a non-limiting embodiment of the present disclosure, the third communication bus assembly 103 is configured to provide a data exchange rate of 150 kbit/s to 350 kbit/s, such as equal to 250 kbit/s+/−50 kbit/s.

In certain embodiments, the tracked vehicle 1 comprises an asynchronous communication network 200, in particular an asynchronous communication bus operating via a TCP/IP protocol, such as an Ethernet-type asynchronous communication bus.

In certain embodiments, the human machine interface 11 and the network device 50 are coupled together via the asynchronous communication network 200.

In certain embodiments, the human machine interface 11 and the vehicle control device 15 are connected to each other in communication via the asynchronous communication network 200.

In particular, the asynchronous communication network 200 is different and distinct from the synchronous communication system 100.

In more detail, the vehicle control device 15 and the human machine interface 11 are connected via two separate communication pathways, in particular in parallel to each other: the asynchronous communication network 200 and the communication system 100, in particular the first communication bus assembly 101.

In particular, the network device 50 is coupled in communication with the human machine interface 11 to exchange data and/or information via the asynchronous communication network 200.

In particular, the network device 50 is coupled in communication with the vehicle control device 15 to exchange data and/or information via the communication system 100, in particular the second communication bus assembly 102.

In other words, the network device 50, the human machine interface 11 and the vehicle control device 15 are connected to the asynchronous communication network 200 via their respective connection ports, in particular of the Ethernet type.

In particular, the network device 50 comprises a connection port 50b, in particular of the CAN-bus type, to be connected to the communication system 100, in particular to the second communication bus assembly 102; in particular, the connection port 50b is a physical port for a connector.

In particular, the network device 50 comprises a connection port 50c, in particular of the Ethernet type, to be connected to the asynchronous communication network 200; in particular, the connection port 50c is a physical port for a connector.

In particular, the human machine interface 11 comprises a connection port 11a, in particular of the CAN-bus type, to be connected to the communication system 100, in particular to the first communication bus assembly 101; in particular, the connection port 11a is a physical port for a connector.

In particular, the human machine interface 11 comprises a connection port 11c in particular of the Ethernet type, in particular the connection port 11c is a physical port for a connector.

In particular, the vehicle control device 15 comprises a connection port 15a, in particular of the CAN-bus type, to be connected to the communication system 100, in particular to the first communication bus assembly 101; the connection port 15a is a physical port for a connector.

In particular, the vehicle control device 15 comprises a connection port 15b, in particular of the CAN-bus type, to be connected to the communication system 100, in particular to the second communication bus assembly 102; the connection port 15b is a physical port for a connector.

In particular, the vehicle control device 15 comprises a connection port 15c, in particular of the Ethernet type, in particular to be connected to the communication 200; the connection port 15c is a physical port for a connector.

In a non-limiting embodiment of the present disclosure, the tracked vehicle 1 comprises a vehicle control device 150, in certain instances, of the same type and/or model and/or performance and/or manufacturer as the vehicle control device 15.

The function of the vehicle control device 150 may be one of the following: to increase the number of analogue input ports; to have a safety control device to be used in case the control device 15 fails; redundancy; relatively increased reliability.

In certain embodiments, The camera 45 is coupled to human machine interface 11 via the asynchronous communication network 200.

In an embodiment, the snow depth measurement device 80 is coupled to the human machine interface 11 via the asynchronous communication network 200.

In an embodiment, the tracked vehicle 1 comprises a dedicated control unit 110 for the winch 10 which is connected to the first communication bus assembly 101 and is in communication with the vehicle control device 15 and the human machine interface 11 via the first communication bus assembly 101. In certain embodiments, the dedicated control unit 110 for the winch 10 defines a device.

In an embodiment, the tracked vehicle 1 comprises an ignition device 120 which is connected to the first communication bus assembly 101 and is in communication with the vehicle control device 15 and the human machine interface 11 via the first communication bus assembly 101. In certain embodiments, the ignition device 120 defines a device.

In a non-limiting embodiment of the present disclosure, the vehicle control device 150 is connected to the vehicle control device 15 via the communication system 100, in particular via a fourth communication bus 104 of the communication system 100. Accordingly, in this embodiment, the vehicle control device 15 comprises a communication port 15d to be connected to the communication system 100, in particular to the fourth communication bus 104. In this embodiment, the vehicle control device 150 comprises a communication port 150d to be connected to the communication system 100, in particular to the fourth communication bus 104.

In certain embodiments, one or a plurality of devices of the tracked vehicle are connected to the fourth communication bus 104 and are thus in communication with the vehicle control device 150 via the fourth communication bus 104.

In an optional and non-limiting embodiment of the present disclosure, the vehicle control device 150 is connected to the first communication bus assembly 101, such as via a communication port 150a, and is thus linked in communication with devices connected to the first communication bus assembly 101.

In certain embodiments, the fourth communication bus 104 being a synchronous communication bus, such as of the CAN-bus type.

In a non-limiting embodiment of the present disclosure, the fourth communication bus assembly 104 is configured to provide a data exchange rate of 300 kbit/s to 700 kbit/s, such as equal to 500 kbit/s+/−100 kbit/s.

Figure 4:
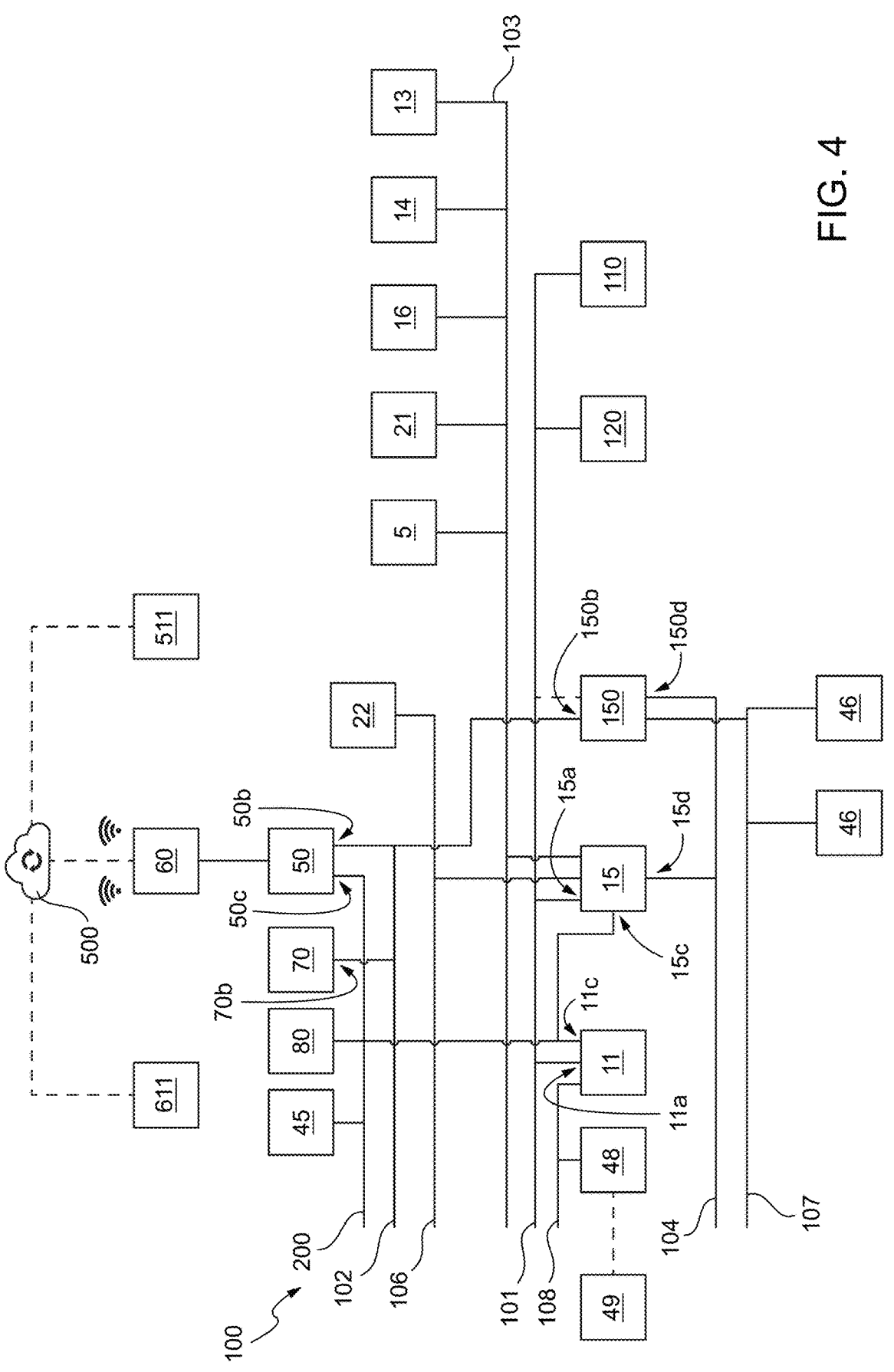
FIG. 4 is a block diagram of a detail of a further embodiment of the tracked vehicle 1.

In an embodiment, illustrated in FIG. 4, the vehicle control device 150 is connected to the network device 15 via the communication system 100, in particular via the second communication bus assembly 102. In the embodiment of FIG. 4, the vehicle control device 15 is not connected to the network device 50 via the communication system 100, in particular vehicle control device is not connected via the second communication bus assembly 102 and does not comprise the communication port 15b.

In a non-limiting embodiment of the present disclosure, the communication system 100 comprises a fifth synchronous communication bus assembly 105. In this embodiment, the drive unit 5 is linked in communication to the vehicle control device 15 via the fifth communication bus assembly 105, which consequently defines a dedicated bus assembly for the drive unit 5. The fifth communication bus assembly 105 can be connected to the human machine interface 11 or not.

In a non-limiting embodiment of the present disclosure, the fifth communication bus assembly 105 is configured to provide a data exchange rate of 150 kbit/s to 350 kbit/s, such as equal to 250 kbit/s+/−50 kbit/s.

In a non-limiting embodiment of the present disclosure, the tracked vehicle comprises a valve assembly 22 for powering and/or controlling certain devices and/or certain functions of certain devices, such as accessory devices 10 and/or certain functions of accessory devices 10. In this embodiment, the communication system 100 comprises a sixth synchronous communication bus assembly 106. In this embodiment, the valve assembly 22 is linked in communication to the vehicle control device 15 via the sixth communication bus assembly 106, which consequently defines a dedicated bus assembly for the valve assembly 22. The sixth communication bus assembly 106 can be connected to the human machine interface 11 or not.

In a non-limiting embodiment of the present disclosure, the sixth communication bus assembly 106 is configured to provide a data exchange rate of 150 kbit/s to 350 kbit/s, such as equal to 250 kbit/s+/−50 kbit/s.

In a non-limiting embodiment of the present disclosure, the tracked vehicle 1 comprises at least one or more inclinometers 46, for example an inclinometer connected to the chassis of the tracked vehicle 1 to detect the inclination of the tracked vehicle 1 and/or an inclinometer of the blade 8 measuring the inclination of the blade 8 and/or an inclinometer of the tiller unit 10 measuring the inclination of the tiller unit 10 which may or may not define devices. In this embodiment, the communication system can optionally comprise a seventh synchronous communication bus assembly 107. In this embodiment, the one or more inclinometers 46 are linked in communication to the vehicle control device 15 via the seventh communication bus assembly 107, which consequently defines a dedicated bus assembly for the one or more inclinometers 46. The seventh communication bus assembly 107 can be connected to the human machine interface 11 or not.

In a non-limiting embodiment of the present disclosure, the sixth communication bus assembly 107 is configured to provide a data exchange rate of 150 kbit/s to 350 kbit/s, such as equal to 250 kbit/s+/−50 kbit/s. In this embodiment, the communication system can optionally comprise an eighth synchronous communication bus assembly 108. In this embodiment, the car radio 48 is linked in communication to the human machine interface 11 via the eighth communication bus assembly 108, which consequently defines a dedicated bus assembly for the car radio 48.

In an embodiment, a mobile phone 49 of an operator can connect to the car radio 48 wirelessly (e.g., via Bluetooth).

In a non-limiting embodiment, once the mobile phone 49 has connected to the car radio 48 it defines the operator code automatically based on an identification number of the mobile phone 49 that has connected.

In a non-limiting embodiment of the present disclosure, the sixth communication bus assembly 107 is configured to provide a data exchange rate of 150 kbit/s to 350 kbit/s, such as equal to 250 kbit/s+/−50 kbit/s.

It should be appreciated that one advantage of having dedicated communication bus assemblies such as the third 103 or the fourth 104 or the fifth 105 or the sixth 106 or the seventh 107 is that a malfunction of one or more of the bus assemblies or of the device connected to such a dedicated communication bus assembly does not affect the malfunction of the others, consequently there is greater relative safety in communication with the vehicle control device 15 with the device connected to the dedicated communication bus assembly.

Figure 5:
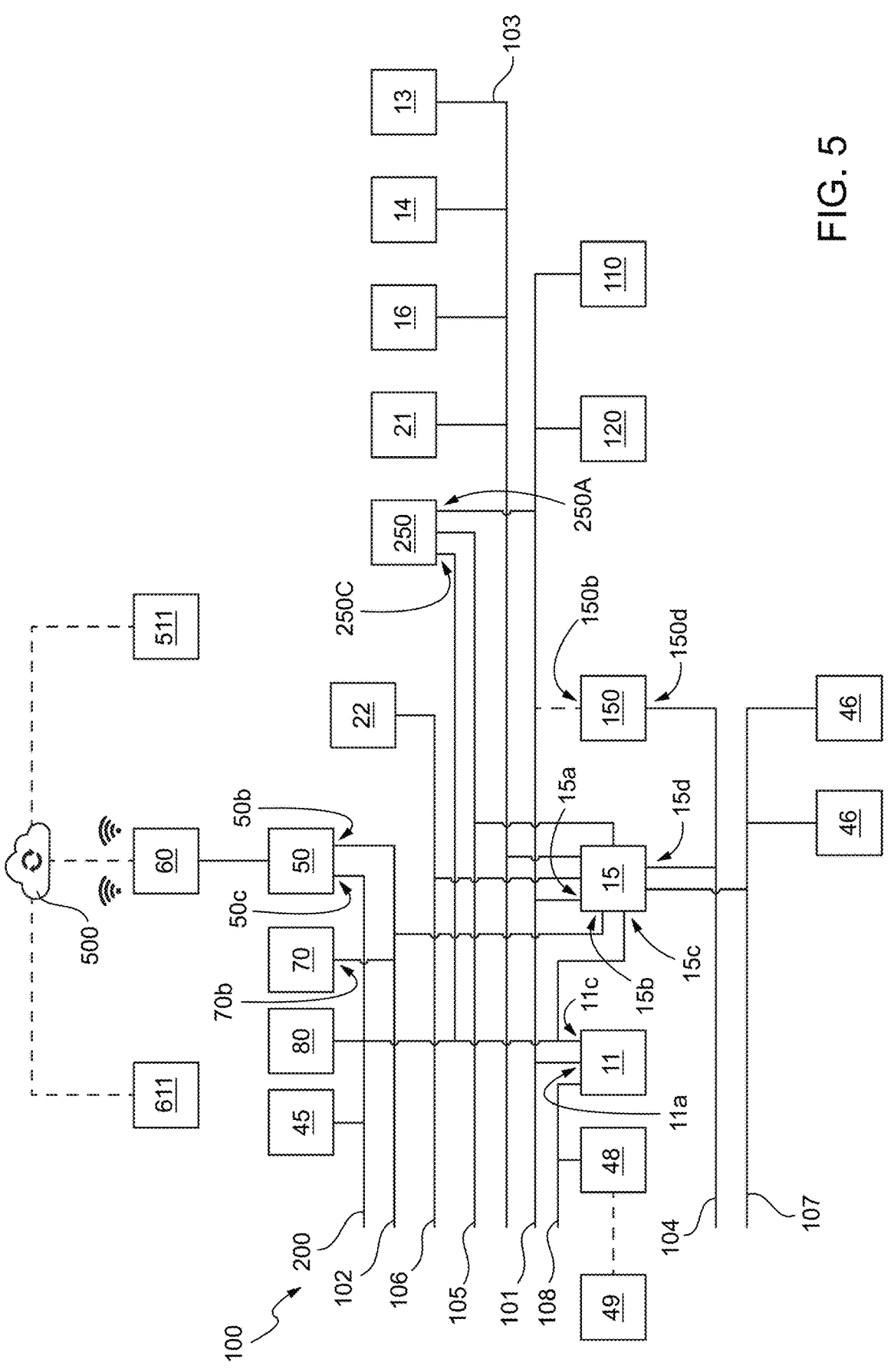
FIG. 5 is a block diagram of a detail of a further embodiment of the tracked vehicle 1.
Figure 6:
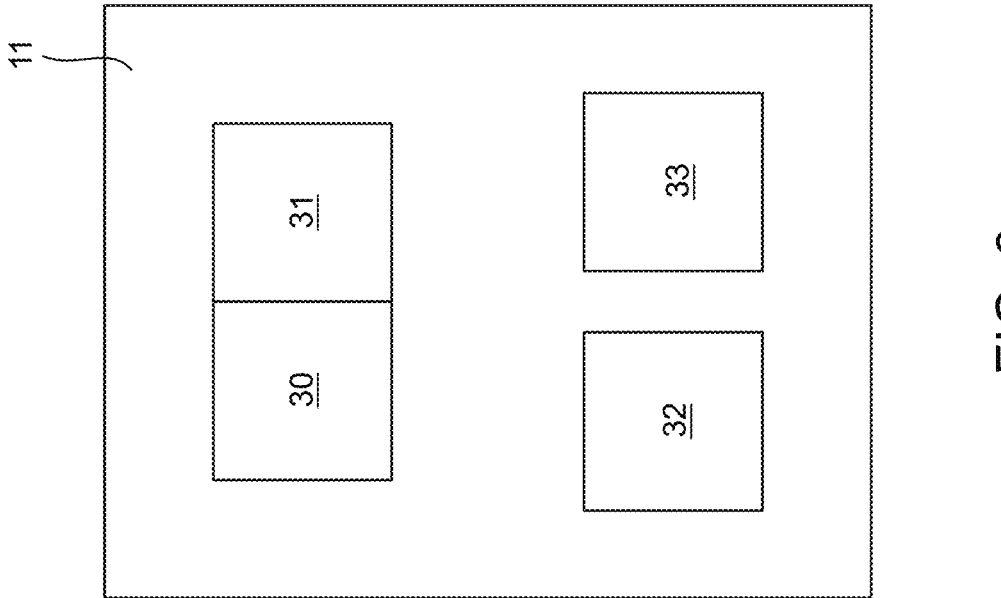
FIG. 6 is a diagram of a detail of the tracked vehicle 1.

In an embodiment depicted in FIG. 5, the tracked vehicle 1 comprises one or more electrical machines, in particular the drive unit 5 comprises one or more of the electrical machines for driving the tracked vehicle 1. In certain embodiments, the tracked vehicle 1 comprises further electrical machines (e.g., for driving the tiller and/or winch and/or other accessory devices). In this embodiment, the tracked vehicle 1 includes a dedicated vehicle control device 250 for driving one or more of the electrical machines, in particular for driving the tracked vehicle 1, in particular for the drive unit 5, and/or for driving one or more of the accessory devices, such as the tiller and/or the winch.

The vehicle control device 250 in an embodiment is of the same type and/or make and model and/or structure as the vehicle control device 15.

In particular, the vehicle control device 250 is connected to the communication system 100, in particular to the first communication bus assembly 101, and to the asynchronous communication network 200.

In particular, the vehicle control device 250 is connected to the control device 50 and/or the human machine interface 11 via the communication system 100, in particular the vehicle control device is connected to the control device 50 and/or the human machine interface 111 via the first communication bus assembly 101 via a connection port 250a of the vehicle control device 250.

In particular, the vehicle control device 250 is connected to the human machine interface 11 via the asynchronous communication network 200 in particular, the vehicle control device 250 comprises a connection port 250c and is connected to the human machine interface 11 via the asynchronous communication network 200 through the port.

Accordingly, the vehicle control device 250 is connected to the human machine interface 11 via two communication pathways, in certain embodiments in parallel: the asynchronous communication network 200 and the communication system 100, in particular the first communication bus assembly 101.

In use, the human machine interface 11 receives detection and/or command signals from the first communication bus assembly 101, in particular the human machine interface receives the values of the operating parameters of the devices; and sends the detection and/or command signals, in certain embodiments intact and/or without processing them, to the network device 50 via the asynchronous communication network 200. In turn, the network device 50 sends these signals to the remote and/or external data processing system 511 via the radio link device 60.

The memory of the human machine interface 11 are stores current working parameters of the devices and operation parameters and/or configuration parameters of the devices; the human machine interface 11 is configured to send the data present in its memory to the network device 50 via the asynchronous communication network 200. In turn, the network device 50 sends the data present in the memory of the human machine interface 11 to the remote and/or external data processing system 511 via the radio link device 60.

The human machine interface 11 comprises a hardware block and a graphic user interface running on the hardware block.

The remote and/or external data processing system 511 comprises at least one of the following: a remote control device; a remote human machine interface; a personal computer external to the vehicle; a tablet external to the vehicle; a mobile telephone external to the vehicle.

The remote and/or external data processing system 511 comprises a hardware block that is the same or different from the hardware block of the human machine interface 11 and the same graphical user interface of the human machine interface running on the hardware block of the remote and/or external data processing system 511 so that the screens viewable on the screen of the human machine interface are the same, such as, for the same enabling user codes, of the screens that can be displayed on the screen of the remote and/or external data processing system 511, and, in certain embodiments, so that the graphical user interface of the remote and/or external data processing system can perform and/or access the same functions, such as by the same operator codes, that the human machine interface 11 can perform and/or access remotely and in certain embodiments, in real time and/or in a manner independent of what the operator is displaying on the screen 30 of the human machine interface 11.

In an embodiment, the human machine interface 11 comprises a software block running on the hardware block. The remote and/or external data processing system 511 comprises a software block that runs on the hardware block of the remote and/or external data processing system 511.

So that the remote and/or external data processing system can remotely and, in certain embodiments, in real time perform and/or access the same functions, such as for the same operator codes, and so that the screens viewable on the screen of the human machine interface are the same as the screens that can be displayed on the screen of the remote and/or external data processing system, in a manner independent of what the operator is displaying on the screen 30 of the human machine interface 11, the software blocks of the human machine interface 11 and the remote and/or external data processing system 511 may be the same as each other or have portions that are the same as each other.

The software blocks of the human machine interface 11 and the remote and/or external data processing system 511 can operate on the same or different operating environments.

By way of non-limiting example, the software blocks of the human machine interface 11 and the remote and/or external data processing system 511 can both operate on the Linux or Windows operating environment.

By way of non-limiting example, the software block of the human machine interface 11 may operate on the Linux operating environment and the software block of the remote and/or external data processing system 511 may operate on the Microsoft Windows operating environment, in which case the software block of the remote and/or external data processing system 511 comprises a portion in common with a portion of the human machine interface block 11 and a further portion comprising an emulator of the Linux environment or a library for making the remote and/or external data processing system 511 compatible with the Linux environment.

In particular, in an optional embodiment, the remote and/or external data processing system 511 connecting to the human machine interface 11 via the asynchronous connection network 200 is configured to perform one or more of the following actions: remotely updating the software of the tracked vehicle 1 and/or of one or more electronic parts thereof and/or of the vehicle control device 15 and/or of the device control units in particular via the human machine interface 11; remotely updating the software of the human machine interface 11; remotely setting or resetting one or more configuration parameters of the tracked vehicle 1, in particular of one or more of the devices of the tracked vehicle 1 by connecting remotely to the human machine interface 11 which, in turn, is configured to connect via the synchronous bus link assembly 101 to the vehicle control device 15.

In particular, in an optional embodiment that may or may not be combined with the preceding forms, the remote and/or external data processing system 511 by connecting to the human machine interface 11 via the asynchronous link network 200 and receiving data travelling on the first configuration bus assembly 101 as described above, is configured to perform one or more of the following actions: remotely displaying all the signals passing over the first communication bus assembly 101 and consequently monitoring in real time the detected values/data of the accessories; performing real time processing of the data in the memory of the human machine interface and/or the data travelling on the first communication bus assembly 101 to verify, in use, the operating and/or setting parameters and/or to assist the operator; remotely mirroring the human machine interface 11; performing processing on the data received at the human machine interface and related to the data travelling on the first communication bus assembly 101 of the tracked vehicle 1 to perform analysis; connecting in real time to the tracked vehicle 1 to verify usage, parameters and to assist the operators; receiving the event recording related to errors and/or other malfunctions stored in the memory of the human machine interface 11 and/or the vehicle control device 15 and/or a control unit of one or more of the devices.

In certain embodiments, the remote and/or external data processing system is configured to perform the operations remotely via the human machine interface 11 independently of what the operator is viewing on the screen of the human machine interface 11.

Similarly, the human machine interface 11 is configured to operate independently of what the remote data processing system 511 is doing, in particular independently of what the remote and/or external data processing system 511 is displaying on its screen and vice versa.

In particular, in an optional embodiment that may or may not be combined with the preceding forms, the remote and/or external data processing system 511 connecting to the human machine interface 11 via the asynchronous link network 200 is configured to instruct and/or guide a user of the tracked vehicle remotely; and/or train and guide offline operators outside the vehicle.

should be appreciated that in accordance with the present disclosure, a virtualisation of the first connection bus assembly 101 takes place as if the remote and/or external data processing system 511 were physically connected to the first connection bus assembly 101 on site.

In an optional embodiment, the remote and/or external data processing system 511 sends command signals and/or instructions to the human machine interface 11 via the network device 50 and, in certain embodiments, via a security protocol implemented by the human machine interface 11. The human machine interface 11, in turn, sends the signals on the first communication bus assembly 101, such as intact and/or without processing them, so that the remote and/or external data processing system 511 can send commands directly to the devices via the human machine interface 11.

Furthermore, as also mentioned above, the human machine interface 11 and/or the control device 15 are configured to detect errors and/or problems of the tracked vehicle 1 and send the result of the error and/or problem detection to the network device 50 via the asynchronous communication network 200 and/or via the synchronous communication system 100, respectively, in particular the second synchronous communication bus assembly 102.

In certain embodiments, in turn, the network device 50 is configured to send data present in the memory 33 of the human machine interface 11 to the remote and/or external data processing system 511 via the radio link device 60.

The operations seen above, are sensitive operations that can significantly affect the operation of the tracked vehicle, consequently, the remote and/or external data processing system 511 is provided with a special authorisation and usually the use of such a system is only granted to specifically trained personnel and, in certain instances, from the same company that manufactured the tracked vehicle.

The tracked vehicle 1 comprises a connection port 70b connected to the communication system 100, in particular to the second communication bus assembly 102, to which any third-party resource management system 70 in particular and, in certain instances, other than the fleet management system 611 can be connected.

In more detail, the resource management system 70 is a device made by third parties other than the manufacturer of the tracked vehicle and not always tested by the manufacturer of the tracked vehicle, and has the function of supporting the management of a fleet of tracked vehicles with third party devices and differently from the fleet management system 611.

Accordingly, the resource management system 70 is directly connected to the vehicle control device 15 via the second communication bus assembly 102 to receive a portion of data travelling on the second communication bus assembly from the vehicle control device 15 and send the data via its own connection to another external fleet management system to which tracked vehicles are connected, even if they are different from each other and in particular made by different manufacturers.

It should be appreciated that based on the first and second communication bus assemblies being two separate and physically different communication buses prevents the management system 70 from being able to block communication between devices of the tracked vehicle and the vehicle control device 15 and/or the human machine interface 11. In other words, the second communication bus assembly 102 is a communication bus of a lower priority level than the first communication bus assembly 101, and devices manufactured by third parties other than the manufacturer of the tracked vehicle 1 can only be connected to the second communication bus assembly 102. In this way, a malfunction of a third-party device can hold up and block communication only on the second communication bus assembly 102. In other words, a malfunction of a third-party device cannot hold up and block the first communication bus assembly 101 that has a higher priority level and to which third-party devices are connected. In this way, a possible malfunction of a third-party device connected to the second communication bus assembly 102 would affect neither the operation of the first communication bus assembly 101 nor of the tracked vehicle 1 let alone the most important parts of the tracked vehicle 1 itself.

The vehicle control device 15 is configured to send data on the operation of the tracked vehicle 1 to the outside world via the network device 50 and the radio device 60. In particular, the vehicle control device 15 synchronously sends data and/or values and/or operating information on the tracked vehicle 1 to the network device 50 via the second communication bus assembly 102. The network device 50 records them and then sends them via the radio device 60 to an external fleet management system 611 via a radio wave link.

In greater detail, the vehicle control device 15 sends to the network device 50 via the second communication bus assembly 102 the values of a portion of the plurality of operating parameters of the devices mentioned above and travelling on the first communication bus assembly 101, in particular one or more of the following operating parameters: number of revolutions of the engine unit 5, accelerator pedal position, total hours of the engine group 5, average and/or instantaneous fuel consumption, status (on or off) of the tiller unit 9, rotational speed of the tiller unit 9, depth of the tiller unit 9, status of the winch unit 10, instantaneous percentage torque of the engine unit 5, pulling force of the winch unit 10, pressure of the tiller unit 9, operating mode of the tiller unit 9, travel speed of the tracked vehicle 1, travel direction of the tracked vehicle 1, rotation speed of the winch unit 10, temperature(s) (such as cooling) of the drive unit 5, cable length (residual and/or released) of the winch unit 10, status of the winch unit 10, hydraulic oil temperature, light status(es), alarm status, buzzer status(es). These parameters are sent periodically via radio waves to an external fleet management system 611 from the vehicle control device 15 via the network device 50 to which the vehicle control device is connected via the second connection bus assembly 102.

The external fleet management system 611 continuously records the values of the portion of the operating parameters the external fleet management system receives.

In certain embodiments, the connection between the vehicle control device 15 and the network device 50 via the second communication bus assembly 102 is one-way, in particular only the vehicle control device 15 sends the values to the network device 50 and, in certain instances, does not receive values from the network device 50.

In particular, data transmission along the second communication assembly 102 takes place using a CAN-bus protocol.

In an optional and non-limiting embodiment of the present disclosure, the control device 15 and the network device 50 do not communicate with each other via the asynchronous communication network 200. In other words, although both the control device 15 and the network device 50 are connected to the asynchronous communication network 200, they are not configured and/or set up to communicate with each other via the asynchronous communication network 200.

Accordingly, with the present disclosure, there are two types of devices that connect remotely to the tracked vehicle 1, the remote and/or external data processing system 511 and the fleet management system 611. The fleet management system 611 receives a portion of the plurality of data that the remote and/or external data processing system 511 receives, in particular a selection of the plurality of operating parameters of the plurality of operating parameters that the remote and/or external data processing system 511 receives.

The fleet management system 611 can comprise the fleet management of a plurality of tracked vehicles 1 in particular of different types and/or from different manufacturers.

The disclosure also applies to a fleet of tracked vehicles 1 comprising a plurality of tracked vehicles 1 as illustrated above and the remote and/or external data processing system 511 connects to the plurality of tracked vehicles 1 and can perform the operations described above for each of the plurality of tracked vehicles 1 either simultaneously or sequentially.

It should be appreciated that variants to the present disclosure can be made without departing from the scope of protection of the appended claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A tracked vehicle comprising:
   a plurality of devices, wherein at least one device of the plurality of devices is selected from an assembly comprising at least two of: a drive unit, an electric rotating machine unit, a power transmission unit, a hydraulic pump, an actuator, a plurality of tracks, a drive wheel, a signalling device, a conditioning unit, a sensor configured to detect a dimension of the tracked vehicle, a winch unit, a tiller unit, a shovel, a blade, a control input device;
   a vehicle control device coupled to the plurality of devices and configured to:
   send command signals to the devices, and
      receive at least one of detection signals and command signals from the devices;
   a radio link device configured to transmit data, via radio waves, to a data processing system remote from the tracked vehicle and comprising at least one of: a remote-control device, a remote human machine interface, a personal computer external to the vehicle, a tablet external to the vehicle, and a mobile phone external to the vehicle;
   a human machine interface comprising a processing unit, a memory, a screen and a selection device configured to receive commands from an operator;
      a network device coupled in communication from one side with at least one of the human machine interface and the vehicle control device, and from another side with the radio link device, wherein the network device is configured to couple, in radio communication, the at least one of the human machine interface and the vehicle control device with the radio link device to communicate data with the data processing system and the network device is configured to send, via the radio link device, a selection of values relating to the first set tracked vehicle operating parameters to a fleet management system;
   an asynchronous communication network configured to couple the human machine interface and the network device together; and
   a synchronous communication system comprising:
   a first synchronous communication bus assembly configured to link, in communication, the vehicle control device, the human machine interface and the plurality of devices, to each other, and a second synchronous communication bus assembly configured to communicatively connect the vehicle control device to the network device, wherein the vehicle control device is configured to send, via the second synchronous communication bus, a first set of values relating to a first set of tracked vehicle operating parameters to the network device.

2. The tracked vehicle of claim 1, wherein the human machine interface and the vehicle control device are communicatively connected to each other via the asynchronous communication network.

3. The tracked vehicle of claim 1, wherein the human machine interface receives at least one of the detection signals and the command signals from the first communication bus assembly of the synchronous communication system and sends the at least one of the detection signals and the command signals to the network device via the asynchronous communication network.

4. The tracked vehicle of claim 3, wherein the memory of the human machine interface stores at least one of current working parameters, operation parameters and configuration parameters of the plurality of devices and the human machine interface is configured to send, via the asynchronous communication network, the data present in the memory to the network device and the network device is configured to send, via the radio link device, the data present in the memory of the human machine interface to the data processing system.

5. The tracked vehicle of claim 1, wherein the human machine interface is configured to receive, via the asynchronous communication network, at least one of the command signals and instructions from the network device and is configured to send the at least one of the command signals and the instructions to the first communication bus assembly of the synchronous communication system to send commands to the device from the data processing system.

6. The tracked vehicle of claim 1, wherein at least one the human machine interface and the vehicle control device are configured to detect at least one of errors and problems of the tracked vehicle and send the result of the detection to the network device via at least one of the asynchronous communication network and the synchronous communication system; and the network device is configured to send, via the radio link device, data in the memory of the human machine interface to the data processing system.

7. The tracked vehicle of claim 1, wherein the human machine interface is configured to receive a second set of tracked vehicle operating parameters via the first communication bus assembly, wherein the second set of tracked vehicle operating parameters comprises the first set of tracked vehicle operating parameters and additional tracked vehicle operating parameters different from the first set of tracked vehicle operating parameters, the human machine interface is configured to send, via the asynchronous communication network, the second set of tracked vehicle operating parameters to the network device and the network device is configured to send, via the radio link device, the second set of tracked vehicle operating parameters to the data processing system.

8. The tracked vehicle of claim 1, wherein at least one of the devices of the plurality of devices comprises a dedicated control unit communicatively coupled with the vehicle control device to at least one of send and receive, via the first synchronous communication bus assembly, at least one of the command signals, wherein the vehicle control device comprises at least a memory which stores at least one of operational parameters and configuration parameters of at least one of the device.

9. A tracked vehicle management system comprising:
a tracked vehicle comprising:
a plurality of devices, wherein at least one device of the plurality of devices is selected from an assembly comprising at least two of: a drive unit, an electric rotating machine unit, a power transmission unit, a hydraulic pump, an actuator, a plurality of tracks, a drive wheel, a signalling device, a conditioning unit, a sensor configured to detect a dimension of the tracked vehicle, a winch unit, a tiller unit, a shovel, a blade, a control input device;
a vehicle control device coupled to the plurality of devices and configured to:
  send command signals to the devices, and
  receive at least one of detection signals and command signals from the devices;
a radio link device configured to transmit data via radio waves;
  a human machine interface comprising a processing unit, a memory, a screen and, a selection device configured to receive commands from an operator, and a hardware block configured to run a software block;
  a network device coupled in communication from one side with at least one of the human machine interface and the vehicle control device, and from another side with the radio link device, wherein the network device is configured to couple, in radio communication, the at least one of the human machine interface and the vehicle control device with the radio link device;
  an asynchronous communication network configured to couple the human machine interface and the network device together; and
a synchronous communication system comprising:
a first synchronous communication bus assembly configured to link, in communication, the vehicle control device, the human machine interface and the plurality of devices, to each other, and a second synchronous communication bus assembly configured to communicatively connect the vehicle control device to the network device, and a data processing system connected to the tracked vehicle via radio waves and the radio link device of the tracked vehicle, the data processing system comprising a hardware block configured to remotely run, in real time, the software block to enable the data processing system to access functions independent of the human machine interface of the tracked vehicle.

10. The tracked vehicle management system of claim 9, wherein:
the human machine interface comprises a hardware block and a graphical user interface running on the hardware block; and
the data processing system comprises a hardware block and the same graphical user interface of the human machine interface such that the screens viewable on the screen of the human machine interface are the same, for the same operator codes, of the screens displayable in association with the data processing system.

11. The tracked vehicle management system of claim 9, wherein the data processing system is configured to remotely perform, via the human machine interface and independent of content being displayed by the screen of the human machine interface, at least one operation of:
  remotely updating, in real time, software of at least one of the tracked vehicle, the vehicle control device, and at least one of the devices;
  remotely updating software of the human machine interface;
  remotely setting at least one configuration parameter of the tracked vehicle by remotely connecting via at least one of the synchronous connection system and the asynchronous connection network to at least one of the human machine interface and the vehicle control device;

displaying via a remote connection to the human machine interface at least one signal, passing over the synchronous communication system and consequently monitoring, in real time, data detected of the devices, instructing the operator of the tracked vehicle remotely;

carrying out real-time processing of at least one of data in the memory of the human machine interface and data travelling on the synchronous communication system to verify at least one of usage parameters, operating parameters and setting parameters; and remote mirroring of the human machine interface.

12. A method of managing a tracked vehicle connected to a data processing system via a radio link device of the tracked vehicle, the method comprising:

remotely performing, via a human machine interface of the tracked vehicle comprising a processing unit, a memory, a screen, a hardware block configured to run a software block and a selection device configured to receive commands from an operator and independent of content being displayed by the screen of the human machine interface, at least one operation of:

remotely updating, in real time, software of at least one of the tracked vehicle, a vehicle control device of the tracked vehicle which is coupled to a plurality of devices of the tracked vehicle and configured to send command signals to the devices, and receive at least one of detection signals and command signals from the devices, and at least one of the devices of the tracked vehicle selected from an assembly comprising at least two of: a drive unit, an electric rotating machine unit, a power transmission unit, a hydraulic pump, an actuator, a plurality of tracks, a drive wheel, a signalling device, a conditioning unit, a sensor configured to detect a dimension of the tracked vehicle, a winch unit, a tiller unit, a shovel, a blade, a control input device;

remotely updating software of the human machine interface;

remotely setting at least one configuration parameter of the tracked vehicle by remotely connecting via at least one of a synchronous connection system of the tracked vehicle comprising a first synchronous communication bus assembly configured to link, in communication, the vehicle control device, the human machine interface and the plurality of devices, to each other, and a second synchronous communication bus assembly configured to communicatively connect the vehicle control device to a network device of the tracked vehicle coupled in communication from one side with at least one of the human machine interface and the vehicle control device, and from another side with the radio link device, wherein the network device is configured to couple, in radio communication, the at least one of the human machine interface and the vehicle control device with the radio link device and an asynchronous connection network to at least one of the human machine interface and the vehicle control device;

displaying via a remote connection to the human machine interface at least one signal, passing over the synchronous communication system and consequently monitoring, in real time, data detected of the devices, instructing the operator of the tracked vehicle remotely;

carrying out real-time processing of at least one of data in the memory of the human machine interface and data travelling on the synchronous communication system to verify at least one of usage parameters, operating parameters and setting parameters; and remote mirroring of the human machine interface, wherein the data processing system comprises a hardware block configured to remotely run, in real time, the software block to enable the data processing system to access functions independent of the human machine interface of the tracked vehicle.

13. The method of claim 12, wherein:

the human machine interface comprises a hardware block and a graphical user interface running on the hardware block; and the data processing system comprises a hardware block and the same graphical user interface of the human machine interface such that the screens viewable on the screen of the human machine interface are the same, for the same operator codes, of the screens displayable in association with the data processing system.

\*　\*　\*　\*　\*